United States Patent [19]

Wong

[11] 4,116,118
[45] Sep. 26, 1978

[54] APPARATUS FOR PREPARING PASTRY

[75] Inventor: Harry Hon Hai Wong, Kowloon, Hong Kong

[73] Assignee: Winner Food Products Limited, Kowloon, Hong Kong

[21] Appl. No.: 772,075

[22] Filed: Feb. 25, 1977

[30] Foreign Application Priority Data

Jul. 21, 1976 [GB] United Kingdom ............... 31221/76

[51] Int. Cl.² .................. A47J 37/10; A47J 27/00
[52] U.S. Cl. ..................... 99/423; 99/443 R; 99/450.1
[58] Field of Search .............. 99/422, 425, 450.1, 99/443; 425/233, 238, 240, 241, 363; 426/419; 100/155 R, 174

[56] References Cited

U.S. PATENT DOCUMENTS

| | | | |
|---|---|---|---|
| 1,891,744 | 12/1932 | Blair | 425/363 |
| 2,842,071 | 7/1958 | Perky | 425/363 |
| 3,489,106 | 1/1970 | Lostanlen | 99/423 X |
| 3,814,006 | 6/1974 | Giraud | 99/423 |
| 3,853,045 | 12/1974 | Marrie | 99/423 |
| 3,978,781 | 9/1976 | Tanguy | 99/423 |

FOREIGN PATENT DOCUMENTS

1,095,705 12/1967 United Kingdom ............... 99/423

*Primary Examiner*—Leonard D. Christian
*Attorney, Agent, or Firm*—St. Onge Mayers, Steward & Reens

[57] ABSTRACT

A cylindrical drum and a roller are mounted for rotation with their respective axes horizontal. The periphery of the roller is adjacent to that of the drum and has one or more recesses of constant depth. The drum and the roller are rotated at the same peripheral speed. A farinaceous paste, supplied to the periphery of the roller in a zone remote from the drum, is repeatedly taken up by the recess or recesses and is transferred to the drum in the form of portions, which may be interconnected. The paste on the drum is heated, so that it is at least partially cooked to pastry, and the pastry is removed from the drum.

5 Claims, 3 Drawing Figures

APPARATUS FOR PREPARING PASTRY

This invention relates to apparatus for the continuous preparation of at least partially cooked pastry.

Our U.K. Patent Specification No. 1 278 describes apparatus for the continuous preparation of at least partially cooked pastry, comprising a substantially cylindrical drum mounted for rotation with its axis substantially horizontal, a nozzle having an elongate discharge opening adjacent the outer curved surface of the drum, the discharge opening lying transversely of the said surface, a pump for feeding a farinaceous paste through the nozzle to apply a film of paste to the said surface, means for heating the film so that the paste is at least partially cooked to pastry, and means for continuously removing the film of pastry from the said surface. This apparatus saves labour, is economical, has a high capacity, and provides a uniform product. However, the pastry is produced in a strip of constant width, which - if waste is to be avoided - can only be cut into squares or rectangles.

The object of the present invention is an apparatus which prepares ready-shaped pastry in the form of a row of separate or interconnected portions of a desired shape, e.g. round.

The invention provides apparatus for the continuous preparation of at least partially cooked pastry, comprising: a substantially cylindrical drum mounted for rotation with its axis substantially horizontal; a roller mounted for rotation with its axis substantially horizontal, the periphery of the roller being adjacent to the periphery of the drum and having one or more recesses of constant depth; means for rotating the drum and the roller at the same peripheral speed; means for supplying a farinaceous paste to the periphery of the roller in a zone remote from the drum, whereby paste is repeatedly taken up by the recess(es) and transferred to the drum in the form of portions; means for heating the paste on the drum so that it is at least partially cooked to pastry; and means for removing the pastry from the drum.

The ends of the recess(es) in the circumferential direction may be interconnected so that the portions transferred to the drum are also interconnected, which facilitates further processing. The recess(es) may, for example, be round.

The roller is preferably positioned substantially at the bottom of the drum, in order to maximise the time which the portions spend on the drum. The paste can conveniently be supplied to the roller by a trough encompassing part of the circumference of the roller. The trough preferably has cooling means in order to prevent premature cooking or drying of the paste in the trough. A scraper may be provided to remove excess paste from the unrecessed part of the roller.

Preferably, the internal surface of the drum is heated, so that heat is transferred to the paste via the drum. The outer exposed surface of the paste may also be heated.

The invention will be described further, by way of example only, with reference to the accompanying drawings, in which.

Figure 1:
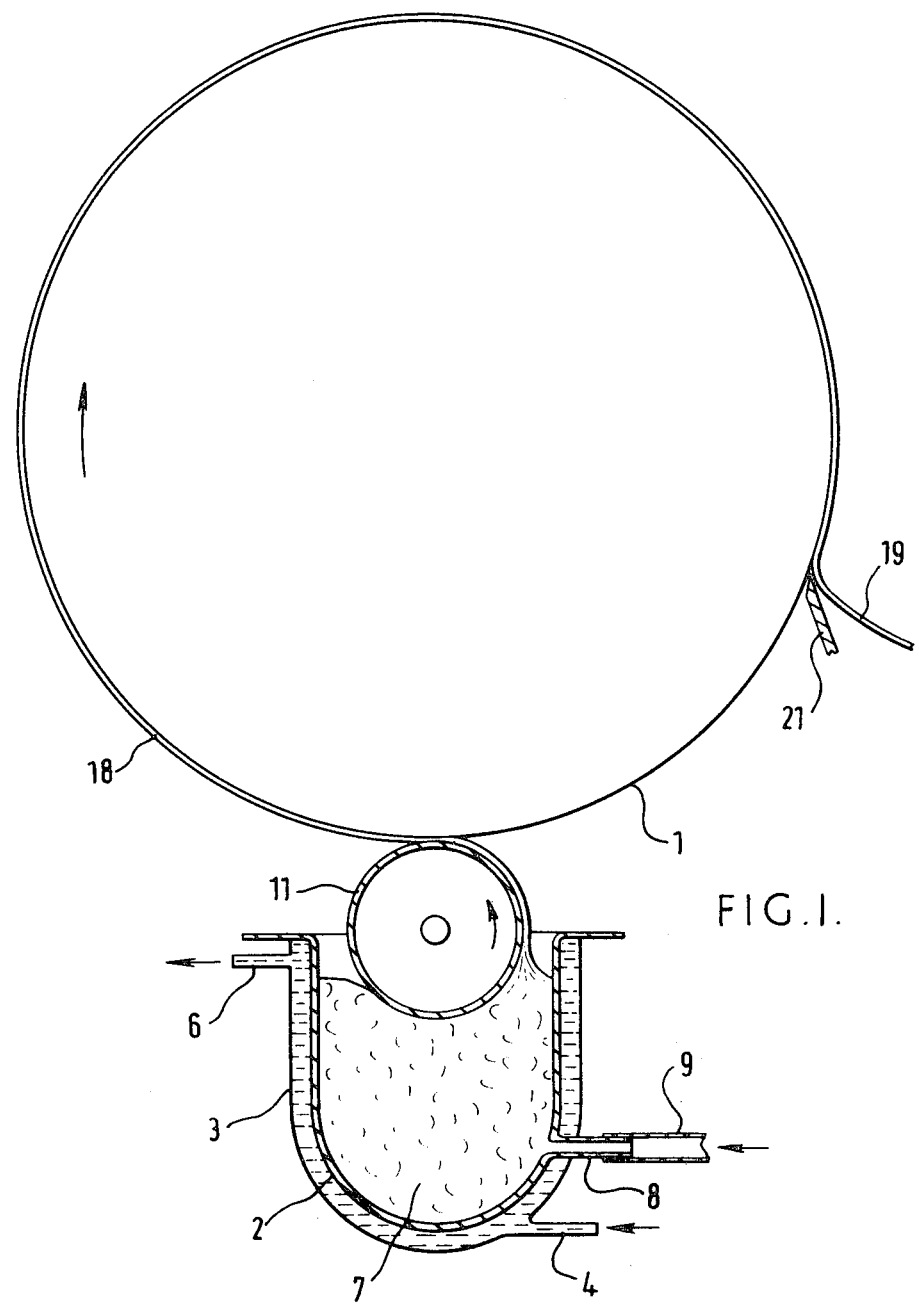
FIG. 1 is a diagrammatic vertical section through apparatus for preparing pastry.
Figure 2:
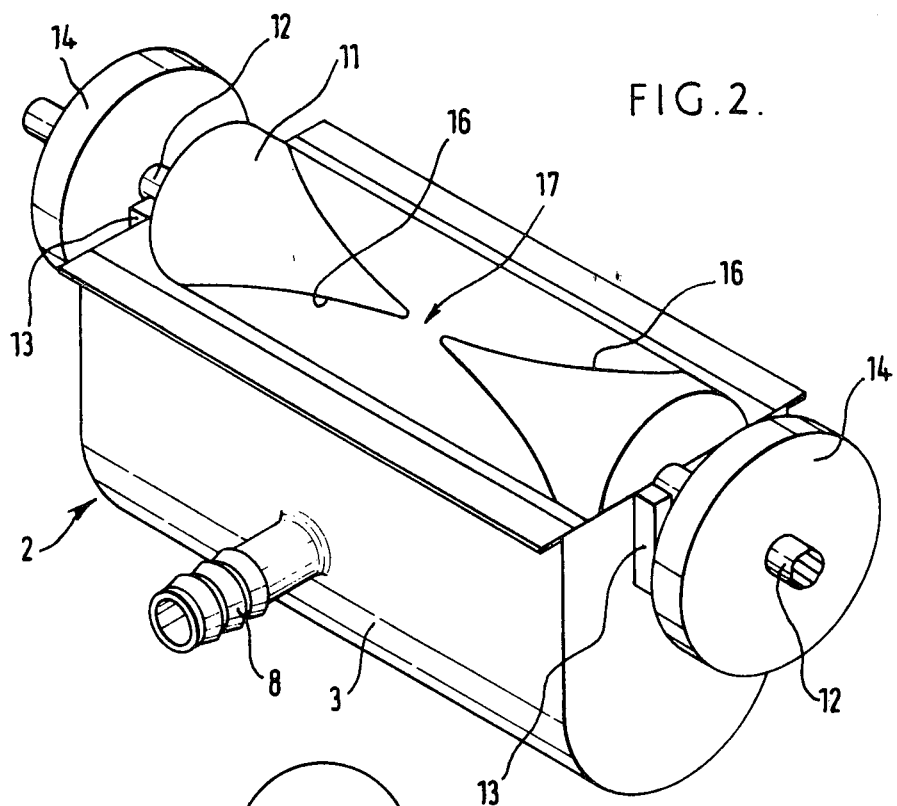
FIG. 2 is a perspective view of part of the apparatus.

The apparatus illustrated comprises a drum 1 and internal and external heating means (not shown) substantially the same as described in U.K. patent specification No. 1 278 526. Beneath the drum 1 there is a trough 2 having a cooling jacket 3 to which water is continuously supplied by a pipe 4, the water leaving through a pipe 6 and being subsequently cooled before being recycled. Flour paste 7 (a soft dough) is supplied to the trough 2 via a spigot 8 through a pipe 9.

A hollow roller 11 is mounted at the bottom of the drum 1 with its periphery adjacent the periphery of the drum. The roller 11 has axles 12 projecting from its end, which axles are adjustably mounted in bearings 13 at the ends of the trough 2. The axles 12 carry respective spacing wheels 14, which bear against the drum 1 and define the spacing between the drum 1 and the roller 11. The wheels 14 are replaceable to vary the spacing. One of the axles 12 is connected to a drive (not shown) which rotates the roller 11 anticlockwise (FIG. 1) at a peripheral speed substantially equal to that of the drum 1, which rotates clockwise.

The periphery of the roller 11 contains engraved recesses 16 of constant depth which would appear circular if the periphery were flattened out. The adjacent parts of the recesses 16 are interconnected, as at 17. The bottom of the roller 11 dips into the paste 7 in the trough 2, and as the roller rotates its recesses 16 pick up circular portions of paste. (Any paste tending to be picked up by the unrecessed area of the periphery can be removed by a scraper, not shown, mounted on the trough 2.) At the top of the roller 11 the paste carried by the recesses 16 comes into contact with the hot surface of the drum 1, to which it adheres, thus being transferred to the periphery of the drum in the form of a strip 18 of varying width but constant thickness.

Figure 3:
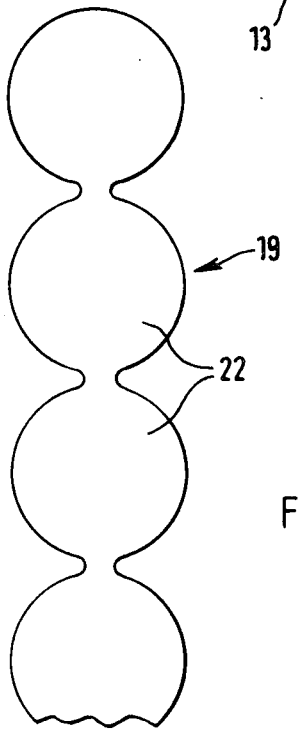
FIG. 3 is a view which shows the product of the apparatus.

As the strip 18 passes round the drum 1, it is cooked, to form a self-supporting strip 19 of pastry, which is removed from the descending part of the drum 1 with the aid of a scraper 21. The finished strip 19 of pastry (FIG. 3) is in the form of interconnected round portions 22 which can be separated from one another with very little waste.

I claim:

1. Apparatus for the continuous preparation of at least partially cooked pastry, comprising: a substantially cylindrical cooking drum mounted for rotation with its axis substantially horizontal; a roller mounted for rotation with its axis substantially horizontal, the periphery of the roller being adjacent to the periphery of the drum and having at least one recess of constant depth; means for supplying a farinaceous paste to the periphery of the roller in a zone remote from the drum, such that upon rotation of said drum and said roller at the same peripheral speed, paste is repeatedly taken up by the said at least one recess and transferred to the drum in the form of portions; and means for removing said portions from the drum.

2. Apparatus as claimed in claim 1, in which each of said recesses is provided with a section interconnecting the leading end of one with the trailing end of the next, whereby the portions of paste transferred to the drum are interconnected.

3. Apparatus as claimed in claim 1, in which the roller is substantially at the bottom of the drum.

4. Apparatus as claimed in claim 1, in which the paste supplying means comprises a trough encompassing part of the circumference of the roller.

5. Apparatus as claimed in claim 4, which further includes means for cooling said paste in said trough.

* * * * *